(12) United States Patent
Kesba (10) Patent No.: US 10,830,630 B2
(45) Date of Patent: Nov. 10, 2020

(54) TDR FILL LEVEL MEASURING DEVICE AND METHOD FOR OPERATING A TDR FILL LEVEL MEASURING DEVICE

(71) Applicant: KROHNE S.A.S., Romans-sur-Isere (FR)

(72) Inventor: Mahmoud Khodjet Kesba, Romans-sur-Isere (FR)

(73) Assignee: KROHNE S.A.S., Romans-sur-Isere (FR)

( * ) Notice: Subject to any disclaimer, the term of this patent is extended or adjusted under 35 U.S.C. 154(b) by 126 days.

(21) Appl. No.: 16/053,001

(22) Filed: Aug. 2, 2018

(65) Prior Publication Data

US 2019/0063982 A1 Feb. 28, 2019

(30) Foreign Application Priority Data

Aug. 25, 2017 (DE) .................. 10 2017 119 502

(51) Int. Cl.
*G01F 23/284* (2006.01)
*G01S 13/88* (2006.01)

(52) U.S. Cl.
CPC ............ *G01F 23/284* (2013.01); *G01S 13/88* (2013.01)

(58) Field of Classification Search
CPC ................ G01F 23/284; G01S 13/88
(Continued)

(56) References Cited

U.S. PATENT DOCUMENTS 3,327,211 A * 6/1967 Taub ................. G01R 21/00
324/95
3,474,337 A 10/1969 Petrick
(Continued)

FOREIGN PATENT DOCUMENTS

| DE | 20 2005 020 158 U1 | 3/2007 |
|---|---|---|
| EP | 3173750 A1 | 5/2017 |
| JP | S5936214 B2 | 9/1984 |

OTHER PUBLICATIONS

Anonymous: "Using Guided Wave Radar for Level in High Pressure Steam Applications", Emerson, Oct. 2016, pp. 1-10, Technical Note 00840-0100-4530, Rev DB, https://www.emerson.com/documents/automation/technical-note-using-guided-wave-radar-for-level-in-high-pressure-steam-applications-rosemount-en-76264.pdf, XP055693883A.

*Primary Examiner* — Erin F Heard
*Assistant Examiner* — Michael W Justice
(74) *Attorney, Agent, or Firm* — David S. Safran; Roberts Calderon Safran & Cole, P.C.

(57) ABSTRACT

A TDR fill level measuring device for measuring the fill level of a medium in a container, having a transmitting unit for transmitting a pulse-shaped electromagnetic measuring signal, a receiving unit for receiving a reflection signal, an evaluation unit for evaluating the reflection signal and a waveguide for guiding the measuring signal and the reflection signal, the waveguide having at least two waveguide sections, each of which has a functional waveguide cross-sectional face, wherein the functional waveguide cross-sectional face corresponds to the cross-sectional face of the waveguide conductor, wherein a reference reflector is present, at least a part of the measuring signal being reflected at least once on the reference reflector during operation. High reliability and a simply design are achieved by the reference reflection being formed by a transition between two waveguide sections having different shapes and/or different sizes of the functional waveguide cross-sectional face.

9 Claims, 4 Drawing Sheets

(58) Field of Classification Search
USPC .......................................................... 342/124
See application file for complete search history.

(56) References Cited

U.S. PATENT DOCUMENTS

| | | | |
|---|---|---|---|
| 3,703,829 A | 11/1972 | Dougherty | |
| 3,812,422 A | 5/1974 | De Carolis | |
| 5,249,463 A | 10/1993 | Willson et al. | |
| 7,012,437 B2 * | 3/2006 | Klofer | G01F 23/284 |
| | | | 324/642 |
| 7,525,476 B1 * | 4/2009 | Delin | G01F 23/284 |
| | | | 324/600 |
| 7,965,087 B2 | 6/2011 | Reimelt et al. | |
| 8,931,339 B2 | 1/2015 | Muller et al. | |
| 9,046,342 B2 * | 6/2015 | Xiao | G01B 7/16 |
| 2004/0113853 A1 * | 6/2004 | Serban | H01Q 1/225 |
| | | | 343/703 |
| 2013/0061669 A1 | 3/2013 | Bogdanchik | |
| 2014/0104099 A1 | 4/2014 | Janitch | |
| 2015/0168203 A1 | 6/2015 | Haas et al. | |

* cited by examiner

Fig. 9

TDR FILL LEVEL MEASURING DEVICE AND METHOD FOR OPERATING A TDR FILL LEVEL MEASURING DEVICE

BACKGROUND OF THE INVENTION

Field of the Invention

The invention is based on a TDR (time domain reflectometry) fill level measuring device for measuring the fill level of a medium in a container, comprising at least one transmitting unit for transmitting a pulse-shaped electromagnetic measuring signal, at least one receiving unit for receiving at least one reflection signal, at least one evaluation unit for evaluating the at least one reflection signal and at least one waveguide, wherein the waveguide has at least one conductor for guiding the measuring signal and the reflection signal, wherein the waveguide has at least two waveguide sections, wherein each waveguide section has at least one functional waveguide cross-sectional face, wherein the functional waveguide cross-sectional face corresponds to the cross-sectional face of at least one conductor, wherein at least one reference reflector is present, and wherein the reference reflector is designed and arranged in such a manner that at least a part of the measuring signal is reflected at least once on the at least one reference reflector during operation.

Furthermore, the invention relates to a method for operating a TDR fill level measuring device for measuring the fill level of a medium in a container, wherein the TDR fill level measuring device has at least one transmitting unit for transmitting a pulse-shaped electromagnetic measuring signal, at least one receiving unit for receiving at least one reflection signal, at least one evaluation unit for evaluating the at least one reflection signal and at least one waveguide, wherein the waveguide has at least one conductor for guiding the measuring signal and the reflection signal, wherein the waveguide has at least two waveguide sections, wherein each waveguide section has at least one functional waveguide cross-sectional face, wherein the functional waveguide cross-sectional face corresponds to the cross-sectional face of at least one conductor, and wherein at least one reference reflector is present, wherein the reference reflector is designed and arranged in such a manner that at least a part of the measuring signal is reflected at least once on the at least one reference reflector during operation.

Description of Related Art

TDR fill level measuring devices known from the prior art use the principle of time-domain reflectometry for measuring the fill level of a medium, preferably a liquid, in a container, wherein the distance of a transmitting unit to the surface of the medium to be measured is determined based on the transit time of a measuring signal transmitted by the transmitting unit and reflected on the surface. The fill level of the medium in the container is then determined from the measured distance when the depth of the container is known. The knowledge of the propagation speed of the measuring signal transmitted in the direction of the medium is essential for the correct determination of the fill level.

The propagation speed of the measuring signal is, in particular, dependent on the permittivity ε of the medium through which the measuring signal moves.

In one type of TDR fill level measurement, a waveguide is provided which guides the measuring signal from the transmitting unit in the direction of the medium and which further guides the reflection signal reflected on the surface of the medium to the receiving unit. Depending on the application, in particular on the parameters of the measuring environment, and depending on the medium to be measured, it is possible that the measuring signal passes through areas with different permittivities above the medium. This is the case, for example, if a temperature gradient is present in the container above the medium.

In order to determine the permittivity distribution above the medium, it is known from the prior art of U.S. Pat. No. 7,525,476 B1 to arrange reference reflectors in the form of cylindrical or differently shaped bodies at fixed spacings on the waveguide. Due to the change in the impedance, the measuring signal propagating along the waveguide is also reflected at the reference reflectors. The permittivity ε of the medium surrounding the waveguide above the reference reflector can be determined based on the knowledge of the distance traveled between the transmitter unit or the receiver unit and the respective reference reflector as well as the transit time of the measuring signal reflected at the reference reflector. This information can be used to correct the propagation speed of the measuring signal along the waveguide and thus to correct the fill level determination of the medium.

From the German Utility Model DE 20 2005 020 158 U1, it is further known to design the reference reflector as a local imperfection in the form of an opening, a notch, a projection or a panel in the waveguide.

Furthermore, the European Patent Application EP 0 534 654 B1 and corresponding U.S. Pat. No. 5,249,463 disclose the reference reflector as a discontinuity in the form of, for example, a collar surrounding the waveguide or in the form of a connection of separately designed waveguide parts.

SUMMARY OF THE INVENTION

Based on this state of the art, the object of the present invention is to specify a TDR fill level measuring device, which, on the one hand, has a particularly high reliability and, furthermore, is designed particularly simply. In addition, the object of the invention is to specify a corresponding method for operating such a TDR fill level measuring device.

According to a first teaching of the invention, the aforementioned object is achieved by a TDR fill level measuring device described in the introduction in that the at least one reference reflector is formed by a transition between two waveguide sections with different shapes and/or different size of the functional waveguide cross-sectional faces. According to the invention, it has been recognized that a reference reflector can be configured in a particularly simple manner by the waveguide itself being designed as a reference reflector in at least one section. Advantageously, the use of additional bodies attached to the waveguide for generating a reference reflection can thus be dispensed with.

Thereby, the at least two waveguide sections, between which the reference reflector is arranged, are arranged directly following one another in the direction of propagation of the measuring signal.

Additionally, the waveguide cross-sectional faces, between which the reference reflector is arranged, are involved in the guiding of the measuring signal during operation.

According to a further design, the transmitting unit and the receiving unit are designed as one unit, namely as a transmitting/receiving unit.

According to a particularly preferred design, at least two reference reflectors are provided, wherein the at least two reference reflectors are designed as a transition between two waveguide sections with different shapes and/or different sizes of the functional waveguide cross-sectional face. According to this design, the permittivity of the medium surrounding the waveguide can be determined in at least two regions so that a permittivity distribution within the container can be detected particularly precisely.

The functional waveguide cross-sectional face can, for example, be rotationally symmetrical, in particular circular, oval or square, in particular square.

According to one design, the waveguide has exactly one conductor for guiding the measuring signal.

According to another design, the waveguide has at least two conductors for guiding the measuring signal.

According to a particularly preferred design, the at least one reference reflector is designed as a tapering of the at least one conductor of the waveguide involved in guiding the measuring signal, that is, as a reduction in the size of the functional waveguide cross-sectional face in respect to the propagation direction while retaining the shape of the functional waveguide cross-sectional face. Alternatively, the reference reflector can also be designed as a thickening of the at least one conductor of the waveguide involved in guiding the measuring signal, i.e., as an increase in the size of the functional waveguide cross-sectional face in respect to the propagation direction of the measuring signal while retaining the shape of the functional waveguide cross-sectional area.

It is also conceivable that, during operation, at least one reference reflector is arranged within the medium so that a permittivity distribution within the medium, for example, a multi-phase medium, can also be detected.

It is also particularly advantageous when the transition of the shape and/or the size between the functional waveguide cross-sectional faces is designed at least partially step-like. In this design, the reference reflection signal reflected at the transition is particularly narrow, whereby the determination of the transit time and thus the determination of the permittivity of the medium surrounding the waveguide section is particularly precise. It is also conceivable for the transition of the shape and/or the size between the functional waveguide cross-sectional faces to be at least partially in stages. According to this design, the reference reflector generates at least two directly successive reference reflection signals or a reference reflection signal spatially or temporally depending on the number and size of the stages. The advantage of this design is that the reference reflection signal can be easily distinguished from the reflection signal reflected on the surface of the medium during evaluation.

According to a further design, the transition of the shape and/or the size between the functional waveguide cross-sectional faces is at least partially designed in the form of a transition region, i.e. continuously. This design has the advantage that the reference reflection signal is temporally or spatially expanded and is thus definable by the reflection signal reflected at the surface of the medium.

Particularly advantageously, the transition of the shape and/or the size between the functional waveguide cross-sectional faces is at least partially spatially extended in the direction of propagation of the measuring signal. For example, the transition can be designed in shifted stages or in shifted steps.

According to a further advantageous design, at least two reference reflectors are provided, the at least two reference reflectors being designed as a tapering of the at least one conductor of the waveguide involved in guiding the measuring signal. It is also advantageous when at last three or more reference reflectors are provided, which each are designed as a tapering, preferably with a step-like transition, of the at least one conductor of the waveguide involved in guiding the measuring signal.

According to a further design, at least two reference reflectors are provided, wherein the at least two reference reflectors are designed as a thickening of the at least one conductor of the waveguide involved in guiding the measuring signal. It is also advantageous when at least one reference reflector is designed as a tapering and one reference reflector is designed as thickening of the at least one conductor of the waveguide involved in guiding the measuring signal. It is also advantageous when at least three or more reference reflectors are provided, which each are designed as a thickening, preferably with a step-like transition, of the at least one conductor of the waveguide involved in guiding the measuring signal.

According to a further design, the position of the at least one reference reflector on the waveguide is determined in dependence on the dimensions of the waveguide and the measuring environment and/or the temperature distribution in the container to be expected during operation. For example, it is advantageous when at least two reference reflectors are present, wherein the at least two reference reflectors are arranged at regular intervals along the waveguide. For example, the distance from the coupling of the measuring signal into the container to the first reference reflector or the distance between the reference reflectors is 1 m in each case.

According to a particularly preferred design, the distance between the coupling of the measuring signal into the container or the distance between the individual reference reflectors is designed as a multiple of the wavelength of the measuring signal. Preferably, the issued measuring signal and the returning reflection signal superimpose constructively.

According to a further design, the distance between the coupling of the measuring signal into the container or the distance between the individual reference reflectors does not correspond to a multiple of the wavelength. This design has the advantage that the reflection signal reflected on the surface of the medium can be distinguished particularly easily from the reference reflection signals.

According to a further design of the fill level measuring device, at least two reference reflectors are provided, which are arranged at irregular intervals along the waveguide.

Furthermore, it is advantageous when at least the transition between the functional waveguide cross-sectional faces that form the reference reflector is designed in one piece. It is particularly preferred that the at least one conductor has no material transitions or joints in the direction of propagation of the measuring signal. The at least one conductor of the waveguide is produced preferably from one workpiece.

Particularly preferably, the waveguide is produced from one workpiece.

According to a further design, the waveguide is designed as a coaxial conductor comprising at least one inner conductor and at least one outer conductor, wherein at least one reference reflector is formed by the at least one inner conductor.

It is further advantageous when the waveguide is designed as a coaxial conductor comprising at least one inner conductor and at least one outer conductor, wherein at least one reference reflector is formed by the at least one outer conductor.

It is also conceivable that the waveguide is designed as a coaxial conductor comprising at least one inner conductor and at least one outer conductor, wherein at least one reference reflector is formed by at least an outer conductor and wherein at least one reference reflector is formed by at least an inner conductor.

It is particularly preferred that the reference reflector formed by the inner conductor and the reference reflector formed the outer conductor are arranged at the same height.

It is also advantageous when the reference reflector formed by the inner conductor and the reference reflector formed the outer conductor are arranged at different heights.

Alternatively, the waveguide can be designed as a simple single probe or as a double probe.

If the waveguide is designed as a double probe comprising a first and a second conductor, the at least one reference reflector is preferably formed by a conductor.

As an alternative, the waveguide is designed as a double probe comprising a first and a second conductor and at least one reference reflector is formed by the first conductor and at least one reference reflector is formed by the second conductor.

It is particularly preferred that the reference reflector formed by the first conductor and the reference reflector formed by the second conductor are arranged at the same height.

It is also advantageous when the reference reflector formed by the first conductor and the reference reflector formed by the second conductor are arranged at different heights.

According to a second teaching of the invention, the initially-derived object is achieved by a method described in the introduction for operating a TDR fill level measuring device for measuring the fill level of a medium in a container in that the at least one reference reflector is formed by a transition between two waveguide sections with different shapes and/or different sizes of the functional waveguide cross-sectional face, and that the method comprises the steps of:

transmitting a measuring signal along the waveguide by the transmitting unit, receiving at least one reflection signal by the receiving unit, wherein the reflection signal is at least a reflection of the measuring signal on the at least one reference reflector, receiving at least one further reflection signal by the receiving unit, wherein the further reflection signal is a reflection of the measuring signal on the surface of the medium to be measured, determining at least one permittivity $\varepsilon$ of a medium surrounding a waveguide section from the transit time of the at least one reflection signal by the evaluation unit, wherein the reflection signal is a reflection of the measuring signal on the at least one reference reflector, determining a correction factor of the propagation speed of the measuring signal along the waveguide based on the at least one permittivity $\varepsilon$ and determining the fill level of the medium located in the container from the transit time and the corrected propagation speed of the at least one further reflection signal, wherein the further reflection signal is a reflection of the measuring signal on the surface of the medium to be measured.

Thereby, the TDR fill level measuring device is particularly preferably designed according to one of the designs described above.

In detail, there is a plurality of possibilities for designing and further developing the fill level measuring device according to the invention and the method according to the invention. Reference is made to the patent claims subordinate to the independent patent claims as well as to the following description of preferred embodiments in conjunction with the drawing. The drawing shows

DETAILED DESCRIPTION OF THE INVENTION

Figure 1:
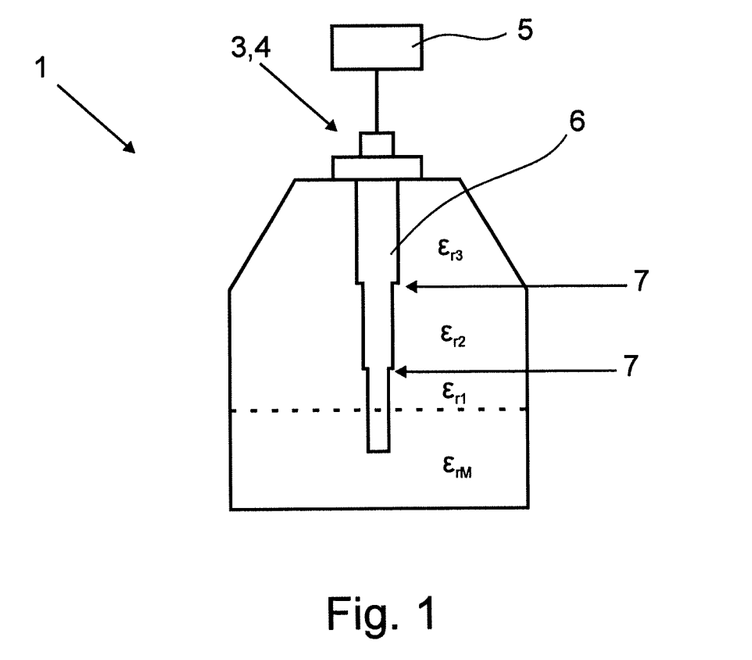
FIG. 1 shows a first embodiment of a fill level measuring device.

FIG. 1 shows a first embodiment of a TDR fill level measuring device 1 for measuring the fill level of a medium in a container, comprising at least one transmitting unit 3 for transmitting a pulse-shaped electromagnetic measuring signal, a receiving unit 4 for receiving at least one reflection signal, an evaluation unit 5 for evaluating the at least one reflection signal and a waveguide 6 for guiding the measuring signal and the reflection signal.

The waveguide 6 is designed in sections as a reference reflector 7, wherein each reference reflector 7 is formed by a step-shaped transition between two waveguide sections having different sizes of the functional waveguide cross-sectional faces 8. In the embodiment shown, two reference reflectors 7 are provided, each of which is designed as a tapering of the waveguide 6. Thereby, the functional waveguide cross-sectional faces 8 are of circular design in the individual waveguide sections in each case.

Due to the known position of the reference reflectors 7 or the known length of the individual waveguide sections and the measured transit time of the reflection signals reflected at the reference reflectors 7, the permittivity $\varepsilon_{r3}$ or $\varepsilon_{r2}$ of the medium surrounding the corresponding waveguide sections can be determined and used for correcting the propagation speed of the measuring signal and, in turn, for determining the fill level of the medium in the container.

According to another embodiment, at least one reference reflector 7 is also arranged in the medium so that the permittivity $\varepsilon_{rM}$ of the medium can also be determined.

Figure 2:
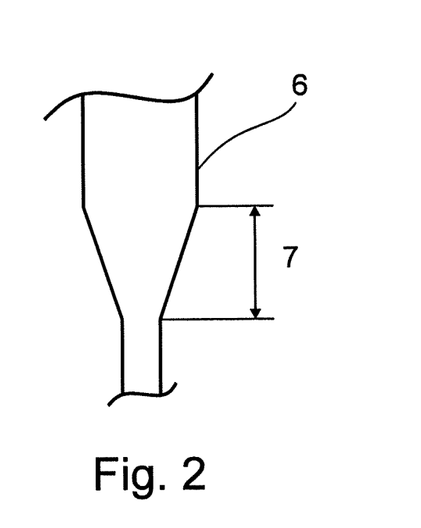
FIG. 2 shows a second embodiment of a waveguide.

FIG. 2 shows a second embodiment of a waveguide 6 with a reference reflector 7, wherein the transition of the size of the functional waveguide cross-sectional face 8 is designed as a spatially extended continuous transition region.

Figure 3:
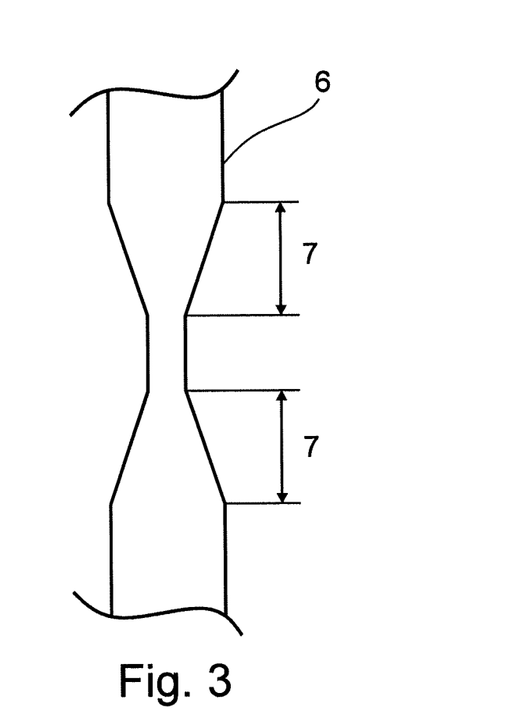
FIG. 3 shows a third embodiment of a waveguide.

FIG. 3 shows a third embodiment of a waveguide 6 with two reference reflectors 7, wherein one reference reflector 7 is designed as a spatially extended tapering of the waveguide 6, and a second reference reflector 7 is designed as a thickened region with a spatially extended transition region.

Figure 4:
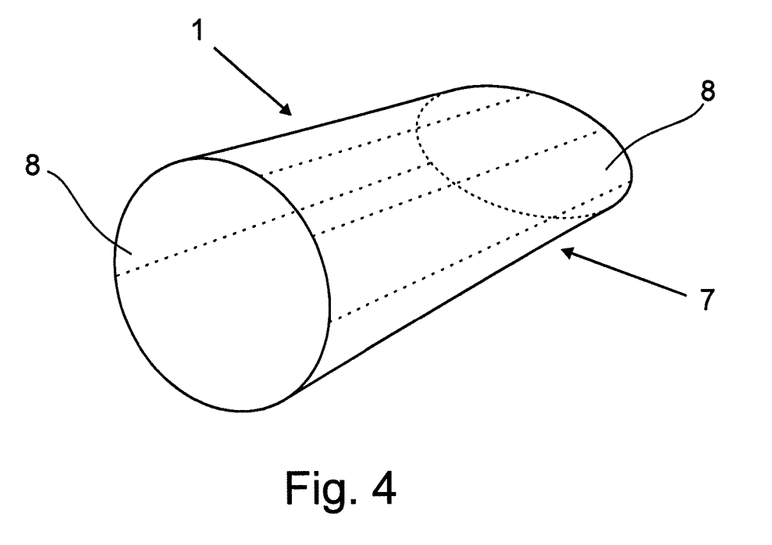
FIG. 4 shows a fourth embodiment of a waveguide.

FIG. 4 shows a further embodiment of a waveguide 6, wherein the reference reflector 7 is designed as a transition between two waveguide sections with different shapes of the functional waveguide cross-sectional faces 8. In detail, the functional waveguide cross sectional face 8 is circular in a first waveguide section, and the functional waveguide cross sectional face 8 is oval in a second waveguide section.

Figure 5:
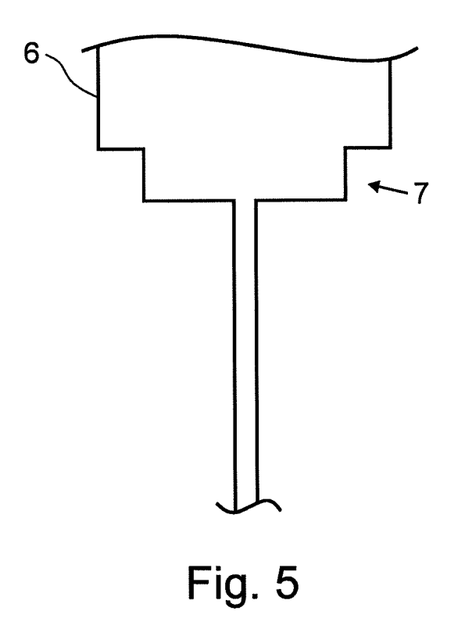
FIG. 5 shows a fifth embodiment of a waveguide.

FIG. 5 shows a further embodiment of a waveguide 6 with a reference reflector 7, wherein the reference reflector 7 is designed as a transition in stages of the size of the functional waveguide cross-sectional faces 8 of a first and a second waveguide section.

Figure 6:
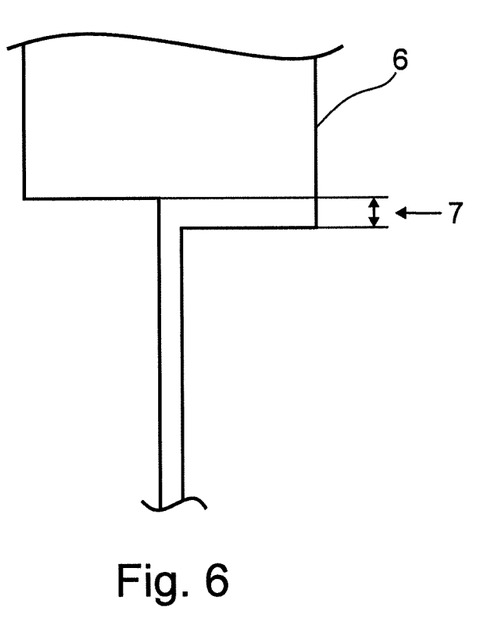
FIG. 6 shows a sixth embodiment of a waveguide.

FIG. 6 shows a further embodiment of a waveguide 6 with a reference reflector 7, wherein the reference reflector 7 configured as a transition between two waveguide sections with a different size of the functional waveguide cross-sectional face 8 is designed so as to be staggered and thus is designed overall as a spatially extended transition area.

Figure 7:
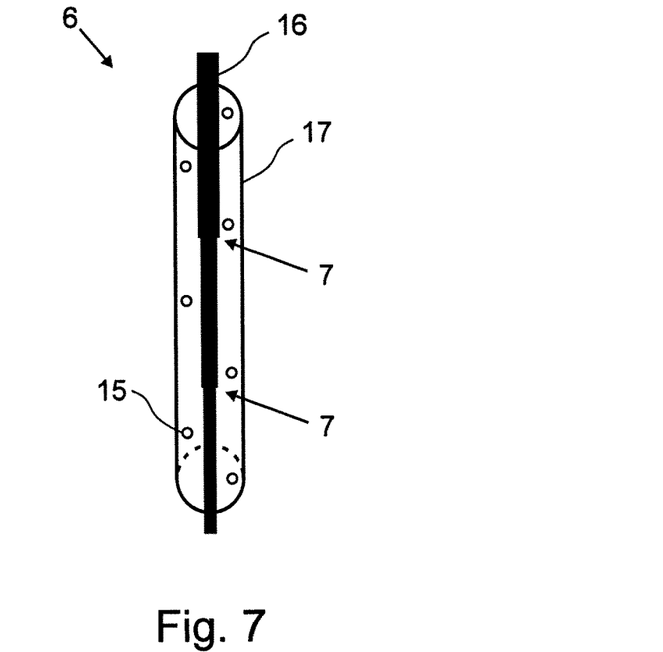
FIG. 7 shows a seventh embodiment of a waveguide.

The waveguide 6 illustrated in FIG. 7 is designed as a coaxial conductor comprising an inner conductor 16 and an outer conductor 17. The outer conductor 17 has holes 15 for allowing the medium to be measured to flow through. The inner conductor 16 is designed in sections as a reference reflector 7.

Figure 8:
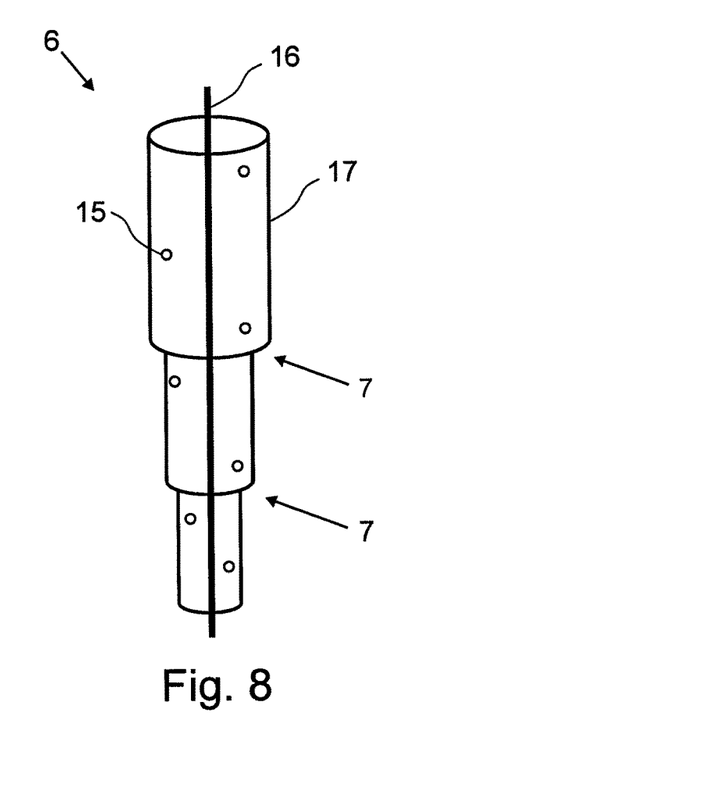
FIG. 8 shows an eight embodiment of a waveguide.

The waveguide 6 illustrated in FIG. 8 is also designed as a coaxial conductor comprising an inner conductor 16 and an outer conductor 17. The outer conductor 17 has holes 15 for allowing the medium to be measured to flow through. Additionally, the outer conductor 17 is designed in sections as a reference reflector 7.

Figure 9:
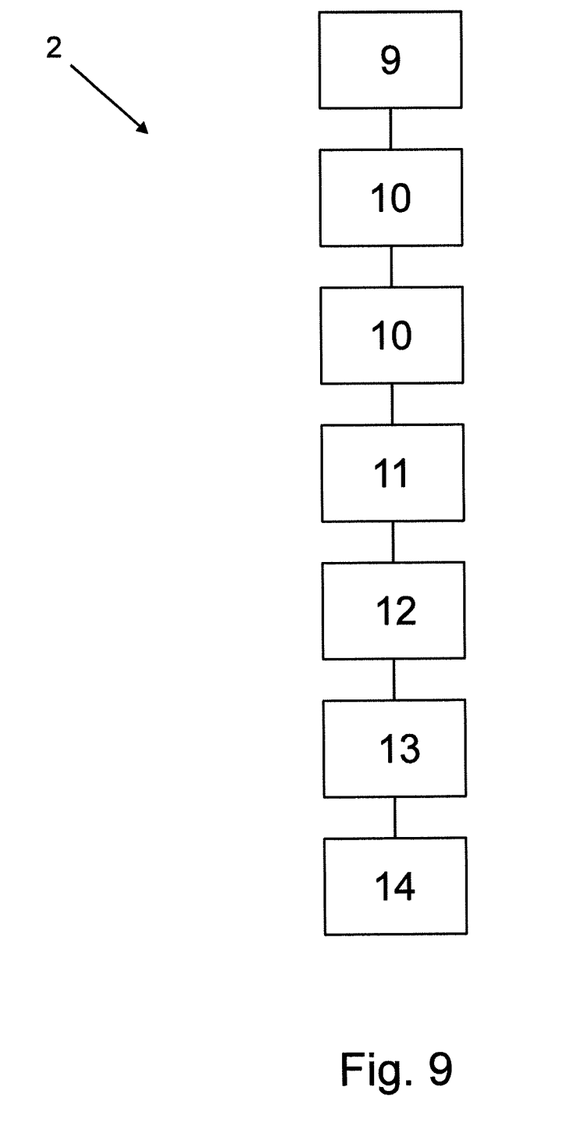
FIG. 9 shows a first embodiment of a method according to the invention.

FIG. 9 shows a first embodiment of a method 2 according to the invention for operating a TDR fill level measuring device 1 for measuring the fill level of a medium in a container. The TDR fill level measuring device 1 is thereby designed as shown in FIG. 1. The method 2 comprises the following steps:

transmitting 9 a measuring signal along the waveguide 6 by the transmitting unit 3, receiving 10 a first reflection signal by the receiving unit 4, wherein the reflection signal is at least a reflection of the measuring signal on the first reference reflector 7, receiving 10 a second reflection signal by the receiving unit 4, wherein the reflection signal is at least a reflection of the measuring signal on the second reference reflector 7, receiving 11 at least one further reflection signal by the receiving unit 4, wherein the further reflection signal is a reflection of the measuring signal on the surface of the medium to be measured, determining 12 the permittivity $\varepsilon_{r3}$ and $\varepsilon_{r2}$ of a medium surrounding the respective waveguide section from the transit time of the first and second reflection signals by the evaluation unit 5, determining 13 a correction factor of the propagation speed of the measuring signal along the waveguide 6 based on the determined permittivities $\varepsilon_{r3}$ and $\varepsilon_{r2}$ and determining 14 the fill level of the medium located in the container from the transit time and the corrected propagation speed of the at least one further reflection signal, wherein the further reflection signal is a reflection of the measuring signal on the surface of the medium to be measured.

The illustrated method 2 has the advantage that the determination of the fill level of the medium to be measured is particularly reliable owing to the consideration of the permittivity distribution above the medium or the adaptation of the propagation speed of the measuring signal or the reflection signal to this permittivity distribution.

What is claimed is:

1. A TDR fill level measuring device for measuring the fill level of a medium in a container, comprising at least one transmitting unit for transmitting a pulse-shaped electromagnetic measuring signal, at least one receiving unit for receiving at least one reflection signal, at least one evaluation unit for evaluating the at least one reflection signal and at least one waveguide, wherein the waveguide has at least one conductor for guiding the measuring signal and the reflection signal, wherein the waveguide has at least two waveguide sections, wherein each waveguide section has at least one waveguide cross-sectional face, wherein the at least one waveguide cross-sectional face is similar in shape to the cross-sectional face of the at least one conductor, wherein the waveguide further comprises at least one reference reflector, wherein the reference reflector is configured and arranged in such a manner that at least a part of the measuring signal is reflected at least once on the at least one reference reflector during operation, and wherein the at least one reference reflector is formed by a transition between two waveguide sections having different shapes and/or different sizes of the waveguide cross-sectional face, wherein the at least one reference reflector forms a transition of form and/or size between the waveguide cross-sectional faces of the waveguide sections, and wherein the at least one reference reflector is at least two reference reflectors, the at least two reference reflectors being formed by a tapering of the waveguide for guiding the measuring signal.

2. The TDR fill level measuring device according to claim 1, wherein the transition of the form and/or size between the waveguide cross-sectional faces of the waveguide sections is at least partially in the form of a continuous transitional section.

3. The TDR fill level measuring device according to claim 1, wherein the transition of the form and/or size between the waveguide cross-sectional faces of the waveguide sections is at least partially spatially extended in a direction of the propagation of the measuring signal.

4. The TDR fill level measuring device according to claim 1, wherein the position of the at least two reference reflectors on the waveguide is set in dependence on the dimensions of the waveguide and the measuring environment and/or on the expected distribution of temperature in the container during operation.

5. The TDR fill level measuring device according to claim 1, wherein the at least two reference reflectors are arranged at regular intervals along the waveguide.

6. The TDR fill level measuring device according to claim 1, wherein at least the transition between the waveguide cross-sectional faces of the waveguide sections that form the references reflectors is formed of a one-piece construction.

7. The TDR fill level measuring device according to claim 1, wherein the waveguide is a coaxial conductor comprising at least one inner conductor and at least one outer conductor, and wherein at least two reference reflectors are formed by the at least one inner conductor.

8. The TDR fill level measuring device according to claim 1, wherein the waveguide is a coaxial conductor comprising at least one inner conductor and at least one outer conductor, and wherein at least two reference reflectors are formed by the at least one outer conductor.

9. A method for operating a TDR fill level measuring device for measuring the fill level of a medium in a container, wherein the TDR fill level measuring device has at least one transmitting unit for transmitting a pulse-shaped electromagnetic measuring signal, at least one receiving unit for receiving at least one reflection signal, at least one evaluation unit for evaluating the at least one reflection signal and has at least one waveguide wherein the waveguide has at least one conductor for guiding the measuring signal and the reflection signal, wherein the waveguide has at least two waveguide sections, wherein each waveguide section has at least one waveguide cross-sectional face, wherein the waveguide cross-sectional faces of the at least two waveguide sections are similar in shape to a cross-sectional face of the at least one conductor, wherein the waveguide further comprises at least one reference reflector, wherein the reference reflector is configured and arranged in such a manner that at least a part of the measuring signal is reflected at least once on the at least one reference reflector during operation, and wherein the at least one reference reflector is formed by a transition between two waveguide sections having different shapes and/or different sizes of the waveguide cross-sectional faces,     wherein the at least one reference reflector forms a transition of the form and/or size between the waveguide cross-sectional faces of the waveguide sections, and     wherein the at least one reference reflector is at least two reference reflectors, wherein at least two reference reflectors are formed of a tapering of the waveguide for guiding the measuring signal, the method comprising the following steps:

transmitting a measuring signal along the waveguide by the transmitting unit,     receiving at least one reflection signal by the receiving unit, wherein the reflection signal is at least a reflection of the measuring signal on the at least one reference reflector,     receiving at least one further reflection signal by the receiving unit, wherein the further reflection signal is a reflection of the measuring signal on the surface of the medium to be measured,     determining at least one permittivity $\varepsilon$ of a medium surrounding a waveguide section from the transit time of the at least one reflection signal by the evaluation unit, wherein the reflection signal is a reflection of the measuring signal on the at least two reference reflectors,     determining a correction factor of the propagation speed of the measuring signal along the waveguide based on the at least one permittivity $\varepsilon$ and     determining the fill level of the medium located in the container from the transit time and the corrected propagation speed of the at least one further reflection signal, wherein the further reflection signal is a reflection of the measuring signal on the surface of the medium to be measured.

* * * * *